United States Patent
Haberkamp et al.

(10) Patent No.: US 10,442,279 B2
(45) Date of Patent: *Oct. 15, 2019

(54) SOFT FRONT COCKPIT COVER

(71) Applicant: Bestop, Inc., Louisville, CO (US)

(72) Inventors: William H. Haberkamp, Rochester Hills, MI (US); George C. Stickles, Thornton, CO (US); Duane C. Junkin, Madison Heights, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,637

(22) Filed: Oct. 13, 2017

(65) Prior Publication Data

US 2018/0037098 A1    Feb. 8, 2018

Related U.S. Application Data

(63) Continuation of application No. 15/286,154, filed on Oct. 5, 2016, now Pat. No. 9,815,356, which is a
(Continued)

(51) Int. Cl.
*B60J 7/12* (2006.01)
*B60J 10/15* (2016.01)
(Continued)

(52) U.S. Cl.
CPC .............. *B60J 7/1291* (2013.01); *B60J 7/12* (2013.01); *B60J 7/143* (2013.01); *B60J 7/1851* (2013.01);
(Continued)

(58) Field of Classification Search
CPC ..... B60J 7/08; B60J 7/0053; B60J 7/12; B60J 7/1291; B60J 10/90
(Continued)

(56) References Cited

U.S. PATENT DOCUMENTS 3,819,227 A    6/1974  Carli
4,821,394 A *  4/1989  Martinez-Vera ......... B60J 7/106
                                                    29/401.1
(Continued)

FOREIGN PATENT DOCUMENTS

BE    350963 A     4/1928
DE    29715809 U1  10/1997
(Continued)

OTHER PUBLICATIONS

Extended European Search Report for Application No. EP 17 19 4977 dated Mar. 26, 2018.
(Continued)

*Primary Examiner* — Dennis H Pedder
(74) *Attorney, Agent, or Firm* — Warn Partners, P.C.

(57) ABSTRACT

A soft panel top assembly for a vehicle in sealing engagement with a hard top portion of a roof. The soft panel top assembly has a fixed portion attached to the vehicle and a lightweight pivotal portion that folds back to provide the occupant a quick and easy open air effect. Two door rails of the soft panel top assembly are connected to the vehicle. Two side rail linkage assemblies are attached to header, which is secured to a windshield frame when in a closed position, and are connected at pivot points created with a bracket attached to the door rails to allow the pivotal portion to pivot to an open position. The soft panel top assembly includes a rear header that is lightweight and engages with the existing seal of the hard top roof portion to provide a weatherproof seal.

21 Claims, 13 Drawing Sheets

Related U.S. Application Data continuation of application No. 14/831,414, filed on Aug. 20, 2015, now Pat. No. 9,539,888, which is a continuation-in-part of application No. 14/243,359, filed on Apr. 2, 2014, now Pat. No. 9,139,073, and a continuation-in-part of application No. PCT/US2015/022716, filed on Mar. 26, 2015, said application No. 15/286,154 is a continuation-in-part of application No. 15/128,773, filed as application No. PCT/US2015/022716 on Mar. 26, 2015, now Pat. No. 9,944,155.

(60) Provisional application No. 61/970,463, filed on Mar. 26, 2014, provisional application No. 61/807,506, filed on Apr. 2, 2013.

(51) Int. Cl.
*B60J 10/90* (2016.01)
*B60J 7/14* (2006.01)
*B60J 7/185* (2006.01)
*B62D 25/06* (2006.01)

(52) U.S. Cl.
CPC ............ *B60J 7/1858* (2013.01); *B60J 10/15* (2016.02); *B60J 10/90* (2016.02); *B62D 25/06* (2013.01)

(58) Field of Classification Search
USPC ................ 296/219, 216.02, 216.03
See application file for complete search history.

(56) References Cited

U.S. PATENT DOCUMENTS

| | | | |
|---|---|---|---|
| 5,299,850 A * | 4/1994 | Kaneko | B60J 7/1291 296/107.13 |
| 6,206,450 B1 | 3/2001 | Ide et al. | |
| 6,409,247 B1 | 6/2002 | Maass | |
| 6,932,423 B2 * | 8/2005 | Stevens | B60J 7/10 296/121 |
| 9,346,342 B1 | 5/2016 | Bowles | |
| 9,539,888 B2 * | 1/2017 | Haberkamp | B60J 7/1291 |
| 9,776,488 B2 | 10/2017 | Bowles | |
| 9,815,356 B2 * | 11/2017 | Haberkamp | B60J 7/1291 |
| 2001/0030443 A1 | 10/2001 | Barker | |
| 2004/0108747 A1 | 6/2004 | Obendiek | |
| 2004/0130188 A1 | 7/2004 | Stevens et al. | |
| 2005/0134096 A1 | 6/2005 | Fallis, III et al. | |
| 2012/0098292 A1 | 4/2012 | Huotari et al. | |
| 2012/0286540 A1 | 11/2012 | Moran et al. | |
| 2014/0103682 A1 | 4/2014 | Lewis et al. | |
| 2014/0138983 A1 | 5/2014 | Haberkamp et al. | |
| 2014/0300143 A1 | 10/2014 | Haberkamp et al. | |
| 2015/0123422 A1 | 5/2015 | Bennett et al. | |
| 2015/0246605 A1 | 9/2015 | Kleinhoffer et al. | |
| 2015/0352937 A1 | 12/2015 | Haberkamp et al. | |
| 2016/0236556 A1 | 8/2016 | Smith et al. | |
| 2016/0263975 A1 | 9/2016 | Bowles | |

FOREIGN PATENT DOCUMENTS

| | | |
|---|---|---|
| DE | 19927234 C1 | 7/2000 |
| DE | 10102643 A1 | 7/2002 |
| DE | 202011105496 U1 | 1/2012 |
| EP | 1634748 A2 | 3/2006 |
| FR | 2745778 A1 | 9/1997 |
| FR | 2937591 A1 | 4/2010 |
| GB | 296586 A | 9/1928 |
| GB | 311081 A | 5/1929 |
| GB | 336514 A | 10/1930 |
| WO | 0132455 A2 | 5/2001 |
| WO | 2004056596 A2 | 7/2004 |

OTHER PUBLICATIONS

International Search Report for Application No. PCT/US2015/022716, dated Jun. 12, 2015.
Extended European Search Report for Application No. EP 16 18 5007, dated Jan. 3, 2017.

* cited by examiner

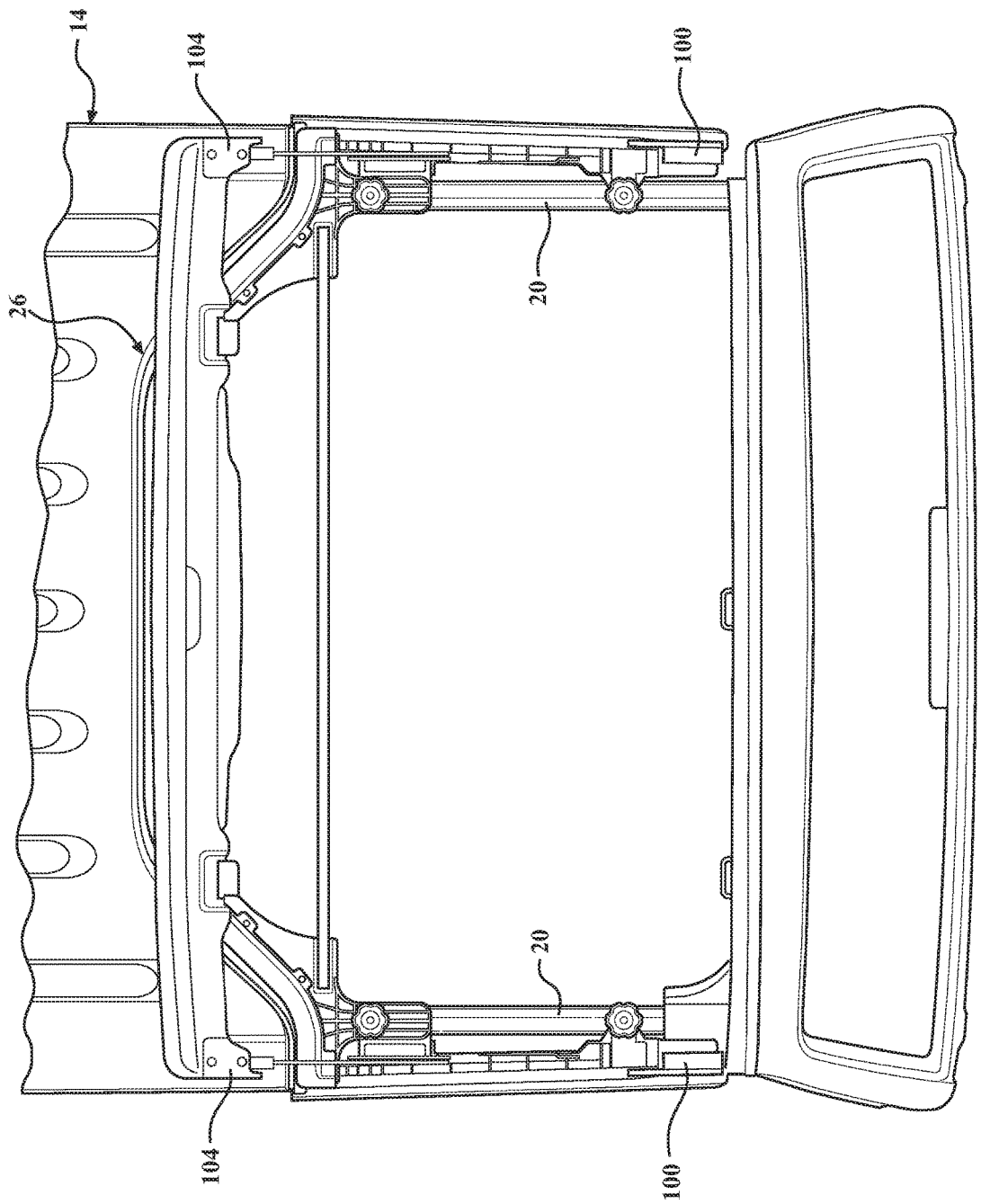

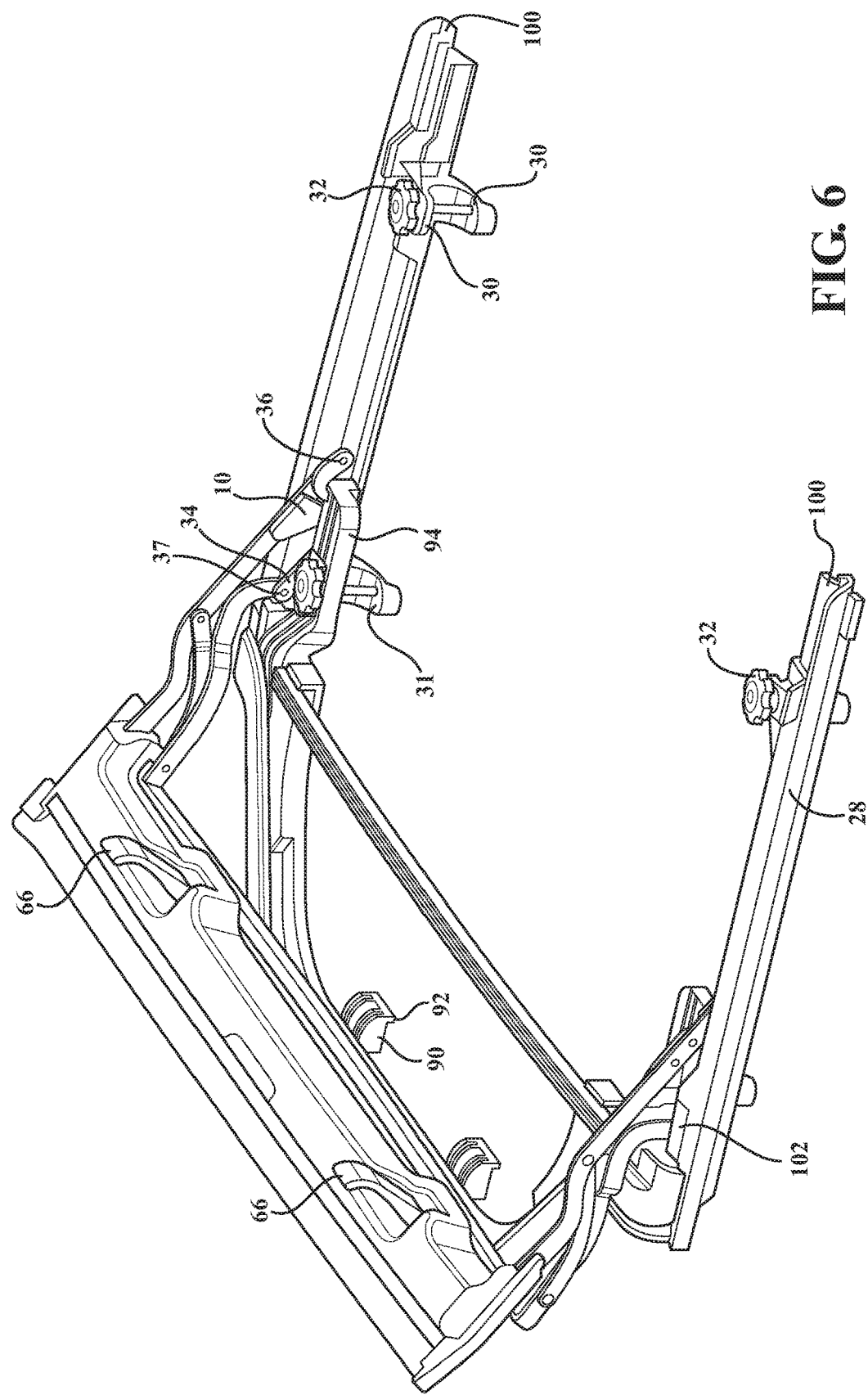

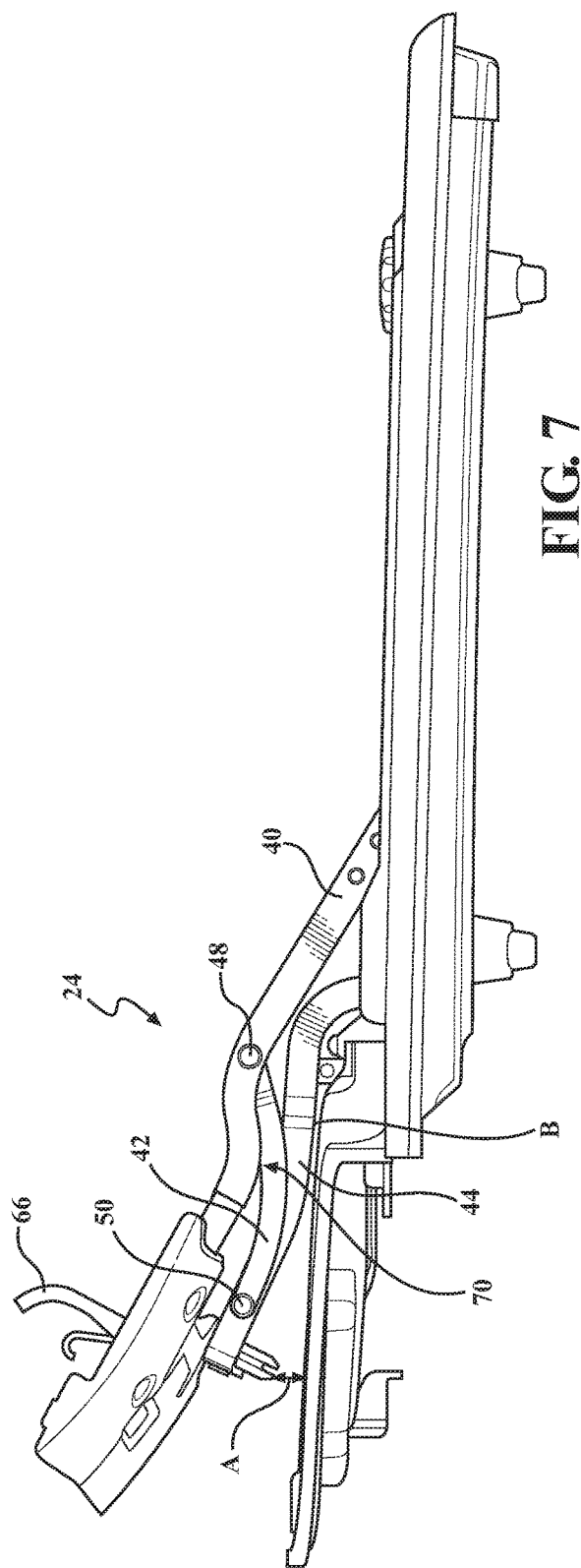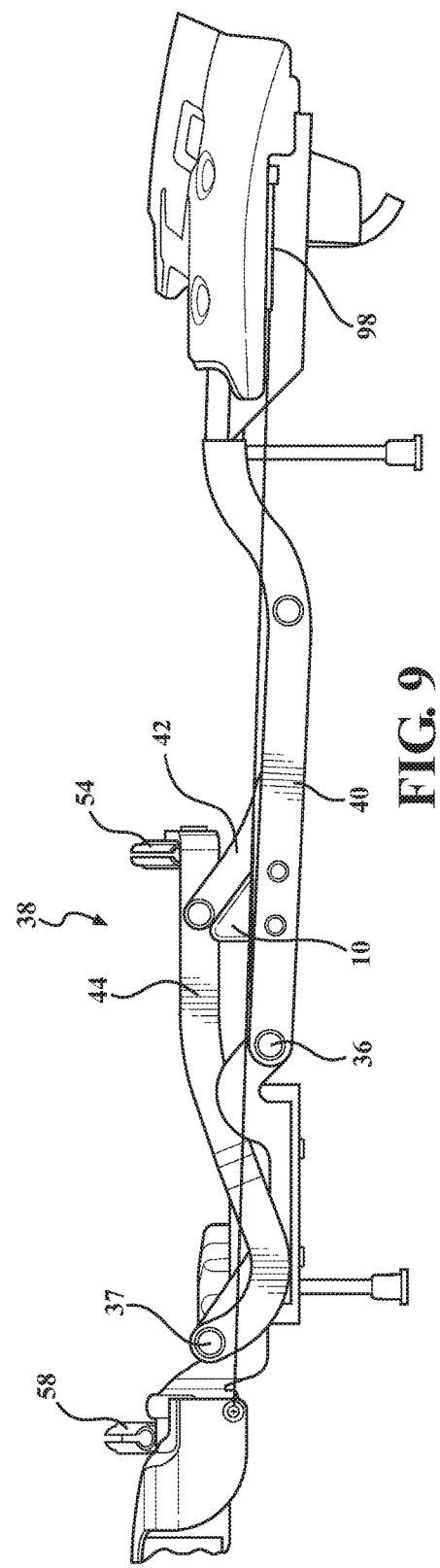

SOFT FRONT COCKPIT COVER

CROSS-REFERENCE TO RELATED APPLICATIONS

The instant application is a continuation patent application of U.S. patent application Ser. No. 15/286,154, filed Oct. 5, 2016, issued as U.S. Pat. No. 9,815,356, which is a continuation of U.S. patent application Ser. No. 14/831,414, filed Aug. 20, 2015, issued as U.S. Pat. No. 9,539,888, which is a continuation-in-part of U.S. patent application Ser. No. 14/243,359, filed Apr. 2, 2014, issued as U.S. Pat. No. 9,139,073, which claims the benefit of U.S. Provisional Application No. 61/807,506, filed Apr. 2, 2013, and which said U.S. patent application Ser. No. 14/831,414, filed Aug. 20, 2015, issued as U.S. Pat. No. 9,539,888, is a continuation-in-part of PCT International Patent Application No. PCT/US2015/022716, filed Mar. 26, 2015, which claims the benefit of U.S. Provisional Application No. 61/970,463, filed Mar. 26, 2014, and which said U.S. patent application Ser. No. 15/286,154, filed Oct. 5, 2016, issued as U.S. Pat. No. 9,815,356 is a continuation-in-part of U.S. patent application Ser. No. 15/128,773, filed Sep. 23, 2016, which is a 371 of PCT International Patent Application No. PCT/US2015/022716, filed Mar. 26, 2015, which claims the benefit of U.S. Provisional Application No. 61/970,463, filed Mar. 26, 2014. The disclosures of the above applications are incorporated herein by reference.

FIELD OF THE INVENTION

The present invention relates to a foldable roof assembly having a soft panel top cover that seals against a hard top portion of the roof.

BACKGROUND OF THE INVENTION

Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily foldable top made of soft material to provide a top that can be opened quickly to provide what is often referred to as an open air feel, where a portion of the top of the roof is moved from a closed or deployed position to an open or stowed position exposing a portion of the inside vehicle cockpit/passenger compartment to the outside without removing the top.

SUMMARY OF THE INVENTION

The present invention is directed to a foldable roof assembly having a soft panel top assembly that is in sealing engagement with a hard top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft panel top assembly has two door rails connected to side sport bars of the vehicle providing a sealing surface for the doors of the vehicle as well as pivot points for the pivotal portion of the soft panel top assembly. The soft panel top assembly has two side rail linkage assemblies connected to a first bow member that is secured to a windshield frame with quick release latches. Each side bow linkage assembly is connected to opposing ends of a fixed bracket connected to the respective door rail creating the pivot points with the use of the brackets. The soft panel top assembly includes a rear header that is a closeout for sealing engagement with an existing seal of the hard top roof portion. The soft panel top assembly is made lightweight by using a lighter rear header, e.g., rear header closeout that is a wireframe and/or lightweight molded section, and by using minimal framing and mostly soft goods. This further helps with ease of installation and ease of cycle efforts of the pivotal portion. Further, the assembly is mountable to the vehicle without any modification, drilling of holes, or any other change to existing hardware and structure to the vehicle other than the removal of the manufacturers existing front cockpit panels.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a top plan view of FIG. 1 with the soft panel top cover assembly shown in an open position;

FIG. 6 is a right perspective view of the soft panel top cover assembly of FIG. 1 with a pivotable portion in an open position;

FIG. 7 is a side elevation view of the soft panel top cover assembly of FIG. 1 in an open position;

FIG. 9 is a side elevation view of the soft panel top cover assembly of FIG. 1 in a closed position;

DETAILED DESCRIPTION OF THE PREFERRED EMBODIMENTS

Figure 1:
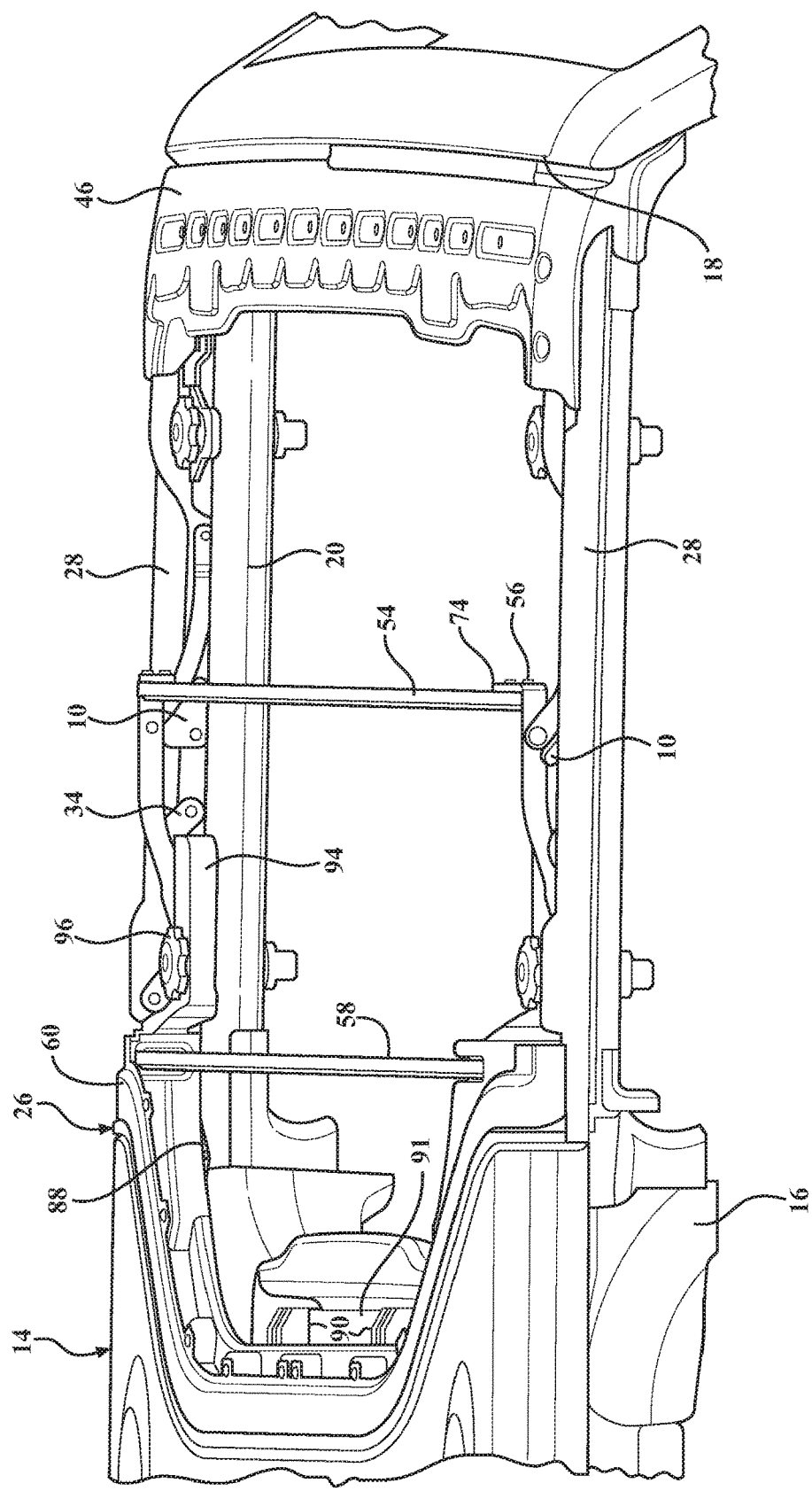
FIG. 1 is a perspective view of a soft panel top cover assembly in a closed position with the fabric cover removed for clarity connected to a vehicle and in sealing engagement with a hardtop portion, in accordance with the present invention.
Figure 2:
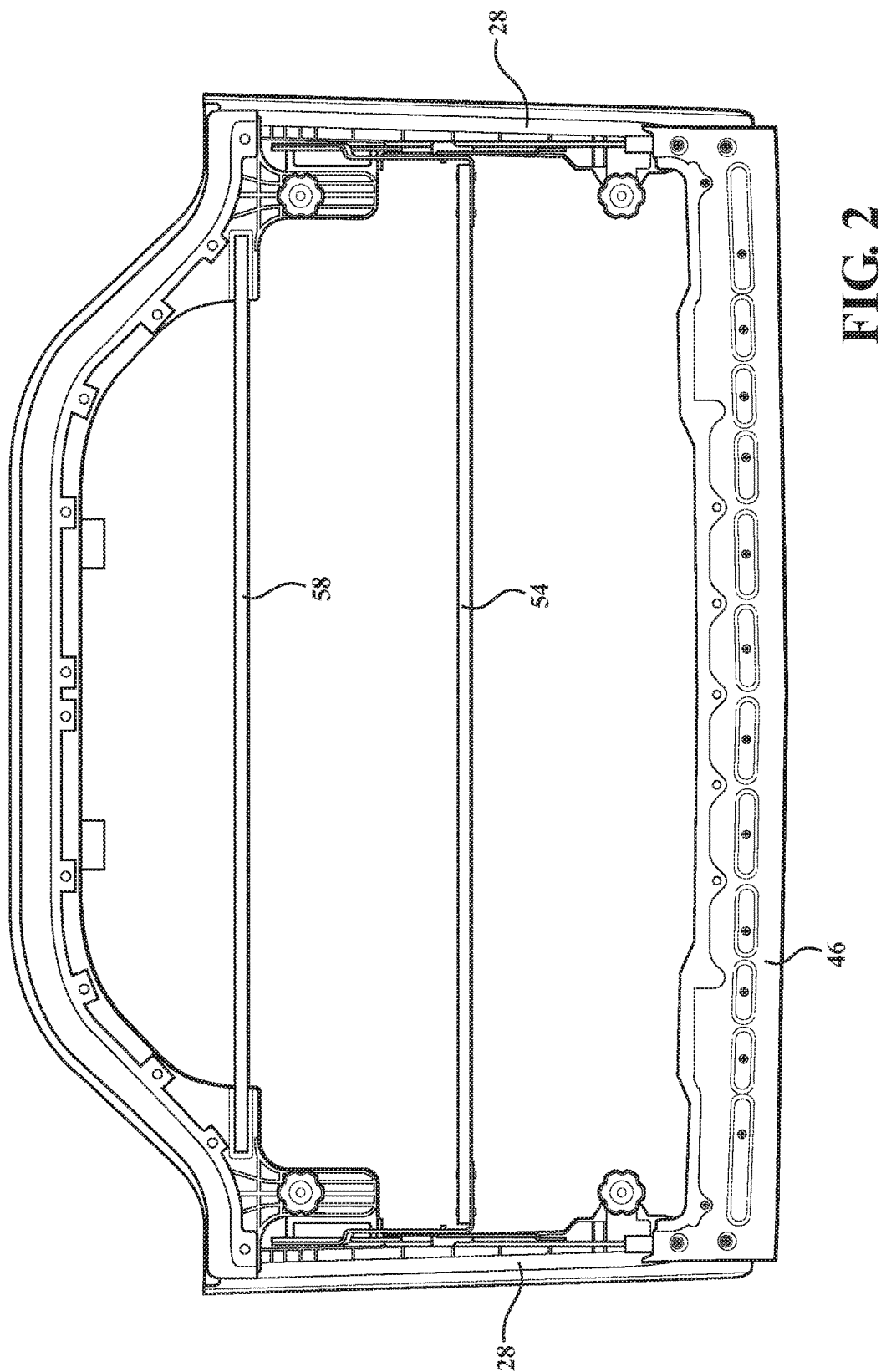
FIG. 2 is a top plan view of the soft panel top cover assembly of FIG. 1.
Figure 3:
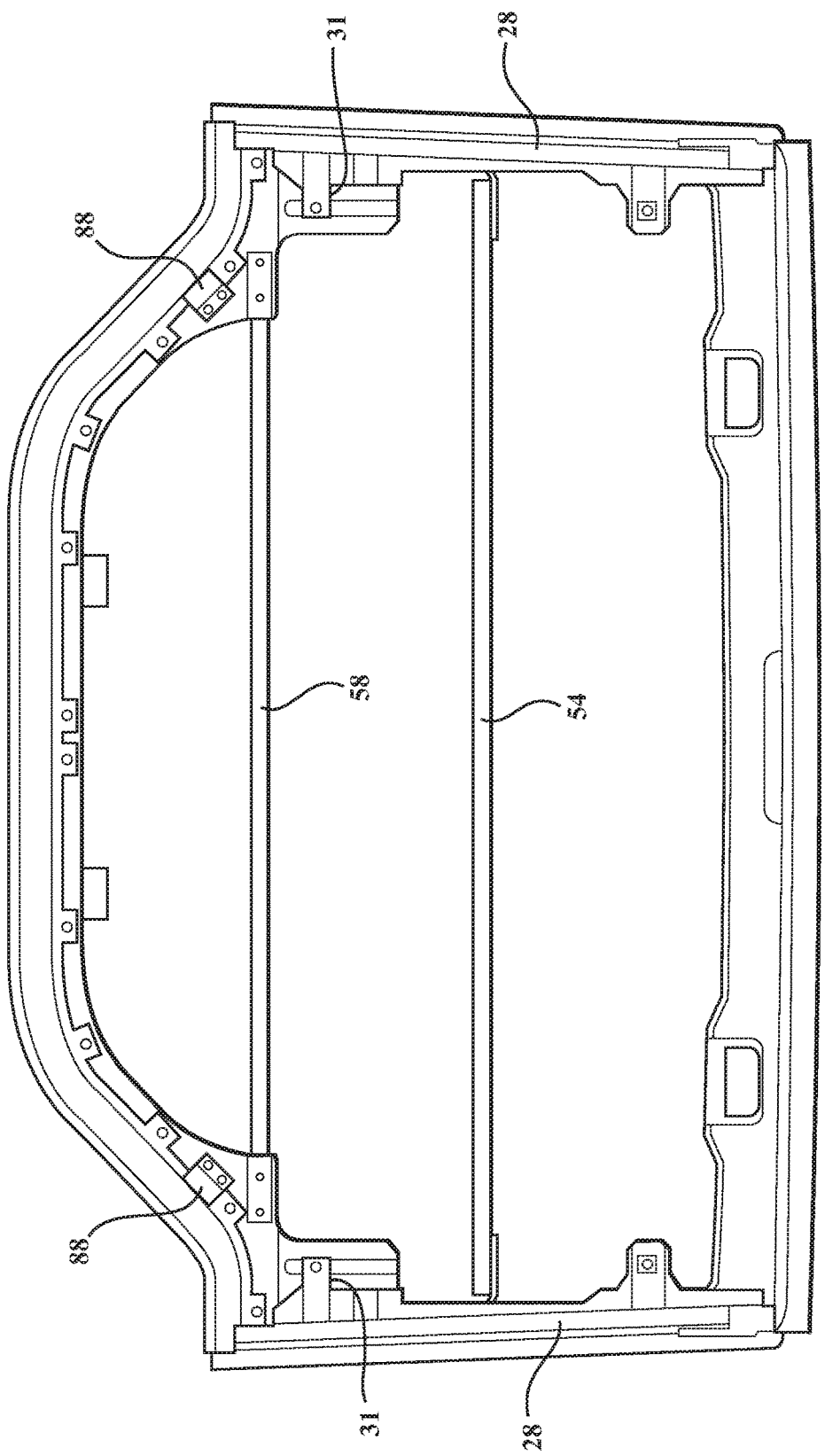
FIG. 3 is a bottom plan view of the soft panel top cover assembly of FIG. 1.
Figure 4:
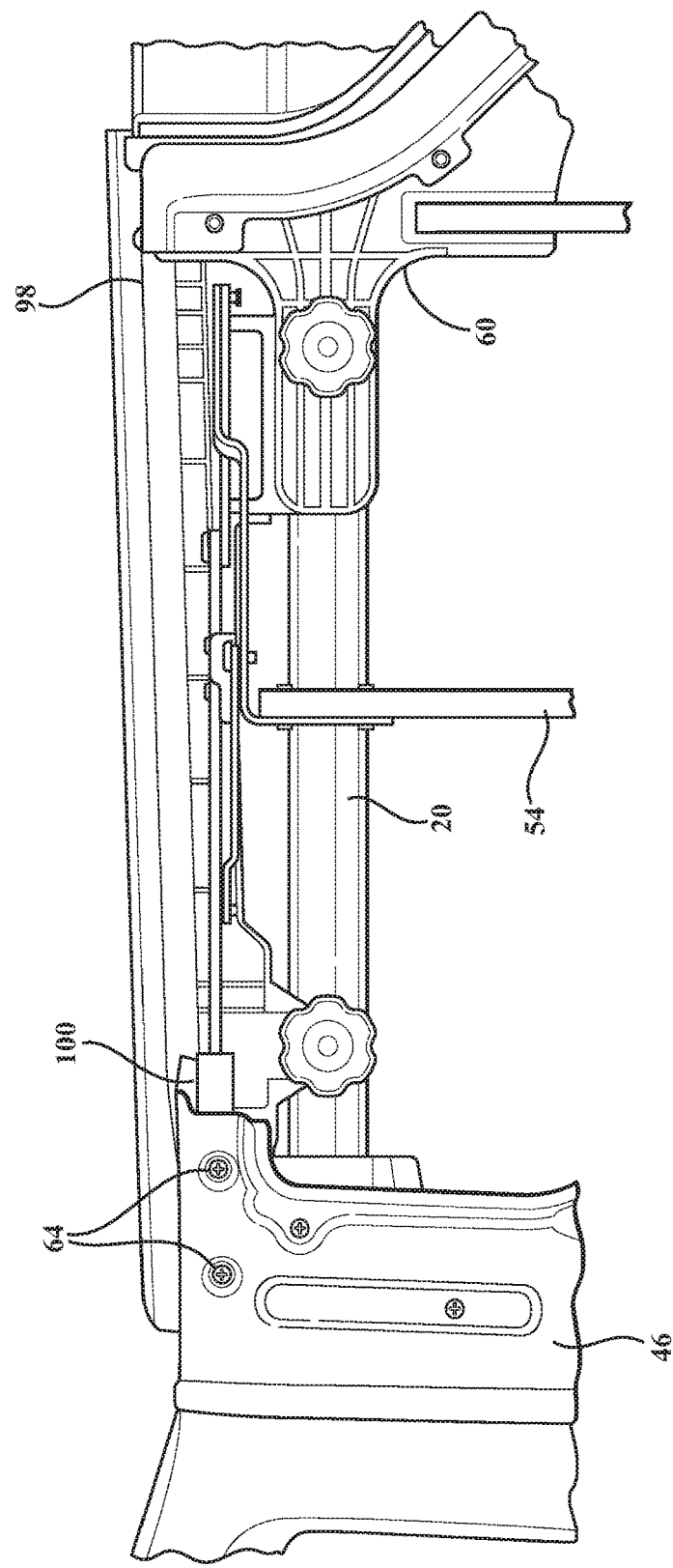
FIG. 4 is a top plan view of the soft panel top cover assembly of FIG. 1 in a closed position.
Figure 8:
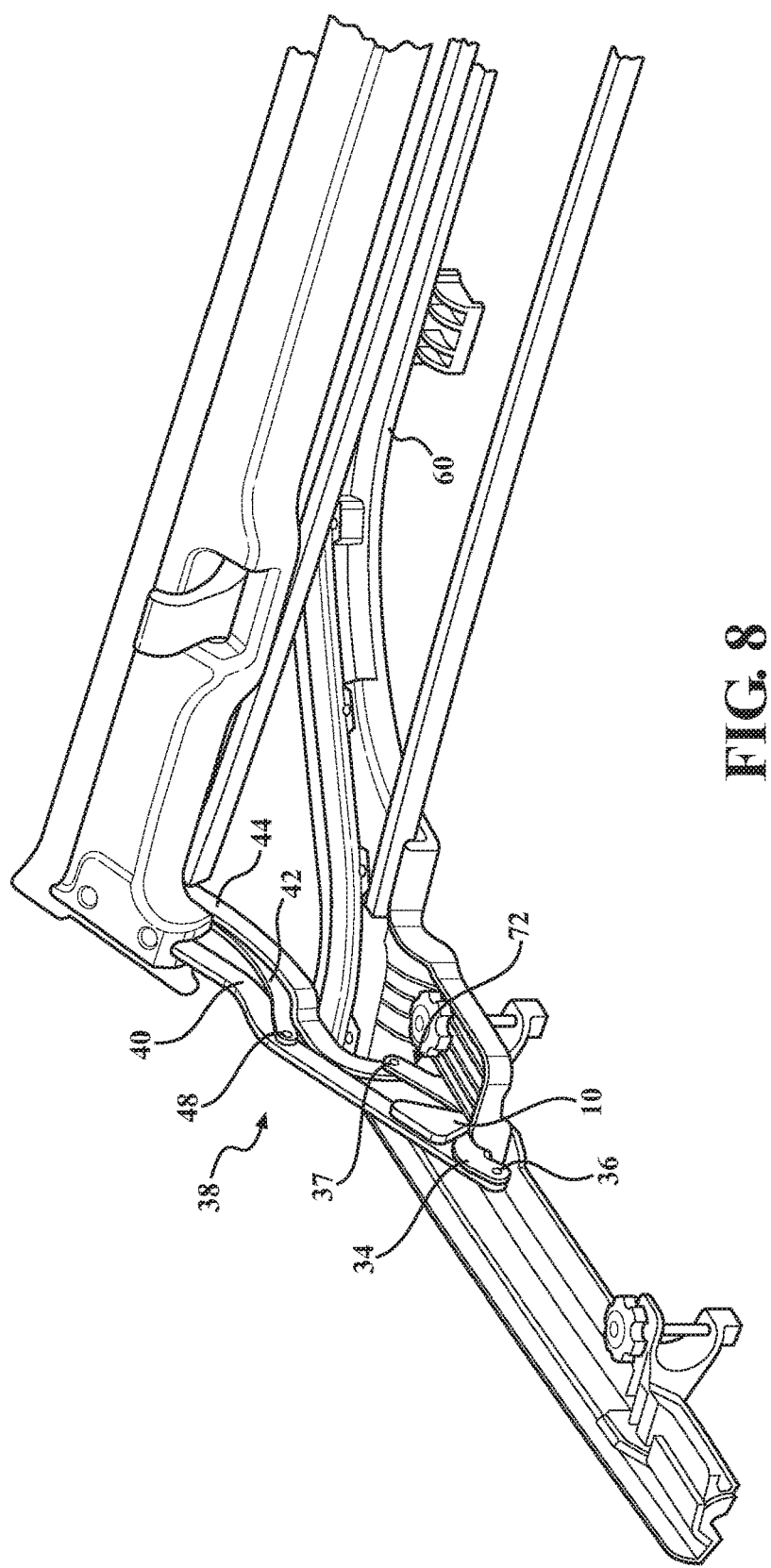
FIG. 8 is a left perspective view of the soft panel top cover assembly in an open position.
Figure 10:
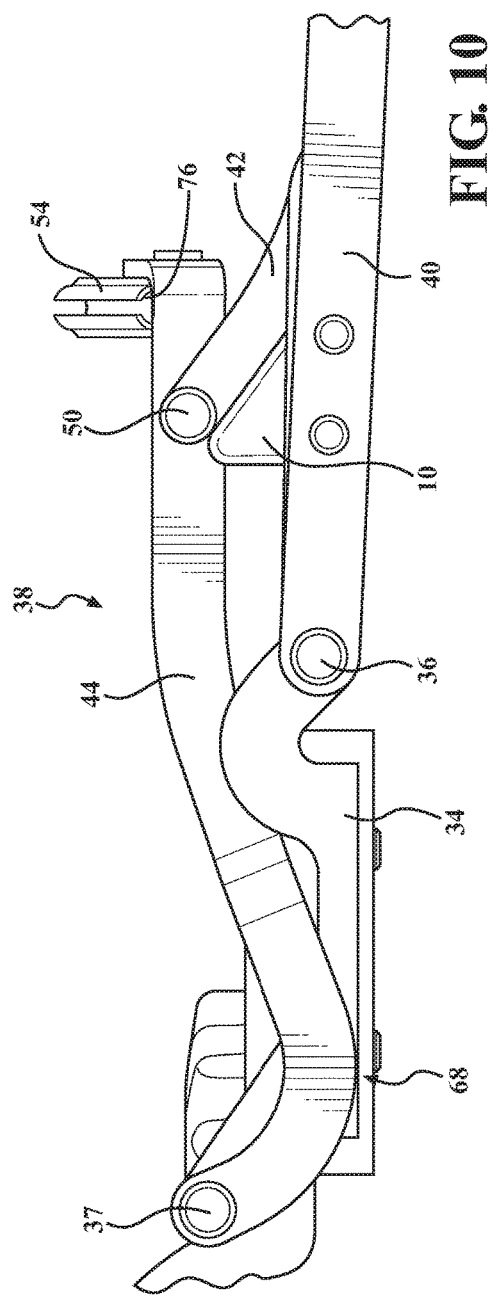
FIG. 10 is a side elevation view of a side rail linkage assembly in a closed position.
Figure 11:
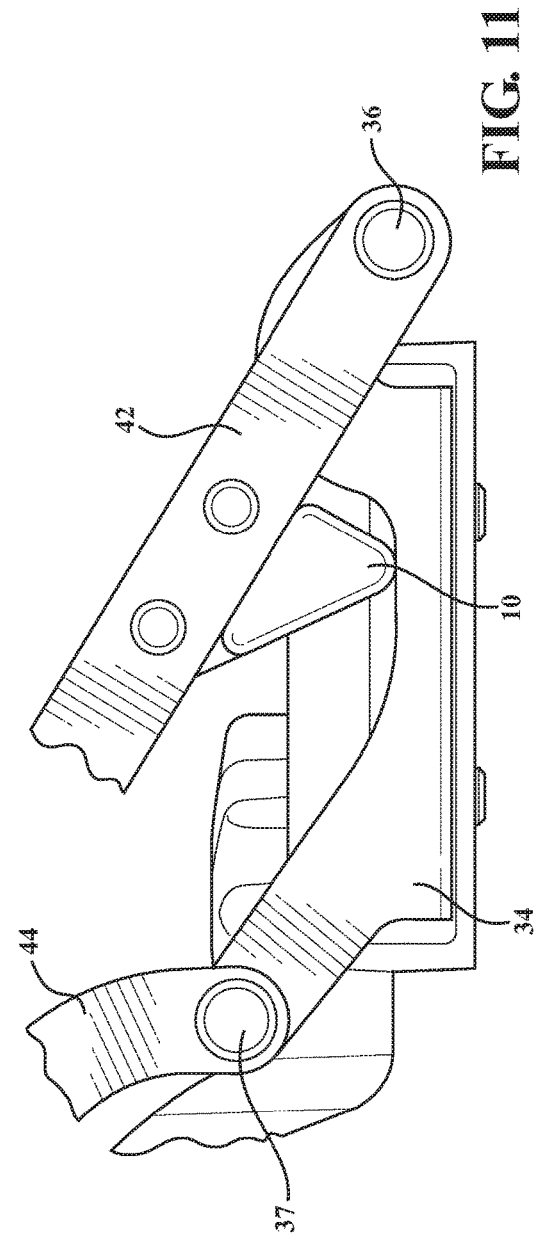
FIG. 11 is an enlarged side elevation view of the side rail linkage assembly in an open position.

The following description of the preferred embodiment(s) is merely exemplary in nature and is in no way intended to limit the invention, its application, or uses.

Referring generally to FIGS. 1-16, there is provided a soft panel top assembly generally shown at 12 that is foldable and sealable with a hard top roof portion generally shown at 14. The soft panel top assembly 12 is connected to a vehicle 16. The vehicle 16 includes a windshield frame 18 with side members 20, e.g., sport bars, extending therefrom and a cross bar or cross member 91 operably connecting the side members 20 substantially adjacent the rear of the driver/passenger compartment.

The soft panel top assembly 12 folds back to give the occupant a quick and easy open air effect, e.g., lightweight and easily operated at a short interval stop, without completely removing the soft panel top assembly 12 from the vehicle 16. Folding the soft panel top assembly 12 between a closed position and an open position is also achievable without the occupant needing to leave the vehicle and eliminates removal and storage of roof panels from the vehicle. Once cycled to the open position, the soft panel top assembly 12 also does not require strapping the assembly down to maintain open air positioning. Further, the soft panel top assembly 12 includes built in stops 10, e.g., bump stops, to prevent over cycling past the desired open position.

The soft panel top assembly 12 has a pivotal portion indicated generally at 24 (FIGS. 7 and 13) for pivoting the soft panel top assembly 12 between the deployed or closed position and a stowed or open position. The assembly 12 geometry generally follows the hardtop 14 contours and seals against the hardtop's bulb seal. When the soft panel top assembly 12 is cycled between the closed/open position, the soft panel top assembly 12 remains in the sealing engagement with the hard top roof portion's 14 bulb seal, generally indicated at sealing portion 26. When the soft panel top assembly 12 is in the closed position the soft panel top assembly 12 also seals with the vehicle windshield frame's 18 bulb seal.

The soft panel top assembly 12 has two door rails 28 each operably connected to a respective side sport bar 20 of the vehicle 16. The door rails 28 provide a sealing surface for the driver/passenger doors of the vehicle 16 as well as pivot points for the pivotal portion 24 of the soft panel top assembly 12. Each door rail 28 has a plurality of clamping surfaces (FIG. 6), including, at least one pair of clamping surfaces 30 forming an upper surface extending inwardly over the top of the sport bar 20 and a bottom surface extending inwardly under the bottom of the sport bar 20. The pair of clamping surfaces 30 attach the front portion of the door rails 28 to the vehicle 16 using threaded mushroom knob fasteners 32 extending through the pair of the clamping surfaces 30 with the sport bar 20 sandwiched therebetween. Another of plurality of clamping surfaces is a rear clamping surface 31 extending inwardly under the bottom of the sport bar 20 to attach the rear portion of the door rails 28 to the vehicle 16 using threaded knob fasteners extending through the rear clamping surface 31 and rear header, as will be explained in greater detail below, with the sport bar 20 sandwiched therebetween.

At least one bracket 34 is fixedly connected by fasteners to both of the two door rails 28 to pivotably connect the pivotable portion 24 to the door rails 28. The brackets 34 provide a forward pivot point 36 and a rearward pivot point 37 for the pivotal portion 24 of the soft panel top assembly 12.

The pivotal portion 24 of the soft panel top assembly 12 has two side rail linkage assemblies generally shown at 38 (FIG. 10), each including the bracket 34, a first link 40, a second link 42 and a third link 44. The first link 42 is fixedly connected to a header 46 or first bow member. The other end of the first link 40 is pivotably connected to the bracket 34 at the forward pivot point 36. The second link 42 is pivotably connected to the first link 40 at a third pivot point 48. The other end of the second link 42 is pivotably connected to the third link 44 at a fourth pivot point 50. The third link 42 is also pivotably connected to the bracket 34 at the rearward pivot point 37.

A bushing and screw arrangement 52 provides for all of the respective pivotal connections such that the side rail linkage assemblies 38 freely pivot to allow the top to be cycled open or closed. However, alternative pivot joint mechanisms can be used without departing from the scope of the invention depending on the particular application.

Figure 12:
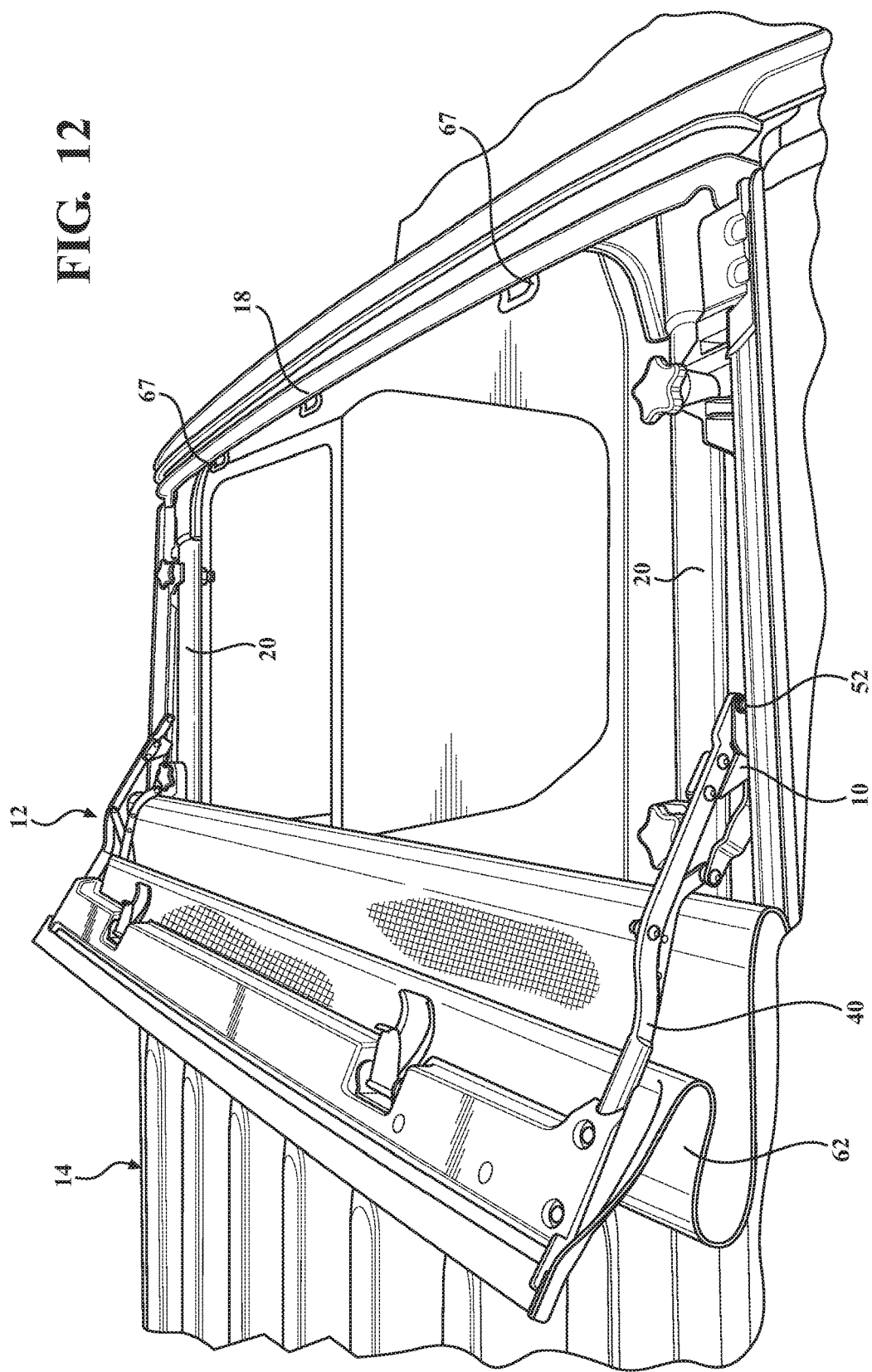
FIG. 12 is a perspective view of the soft panel top cover assembly in an open position.
Figure 13:
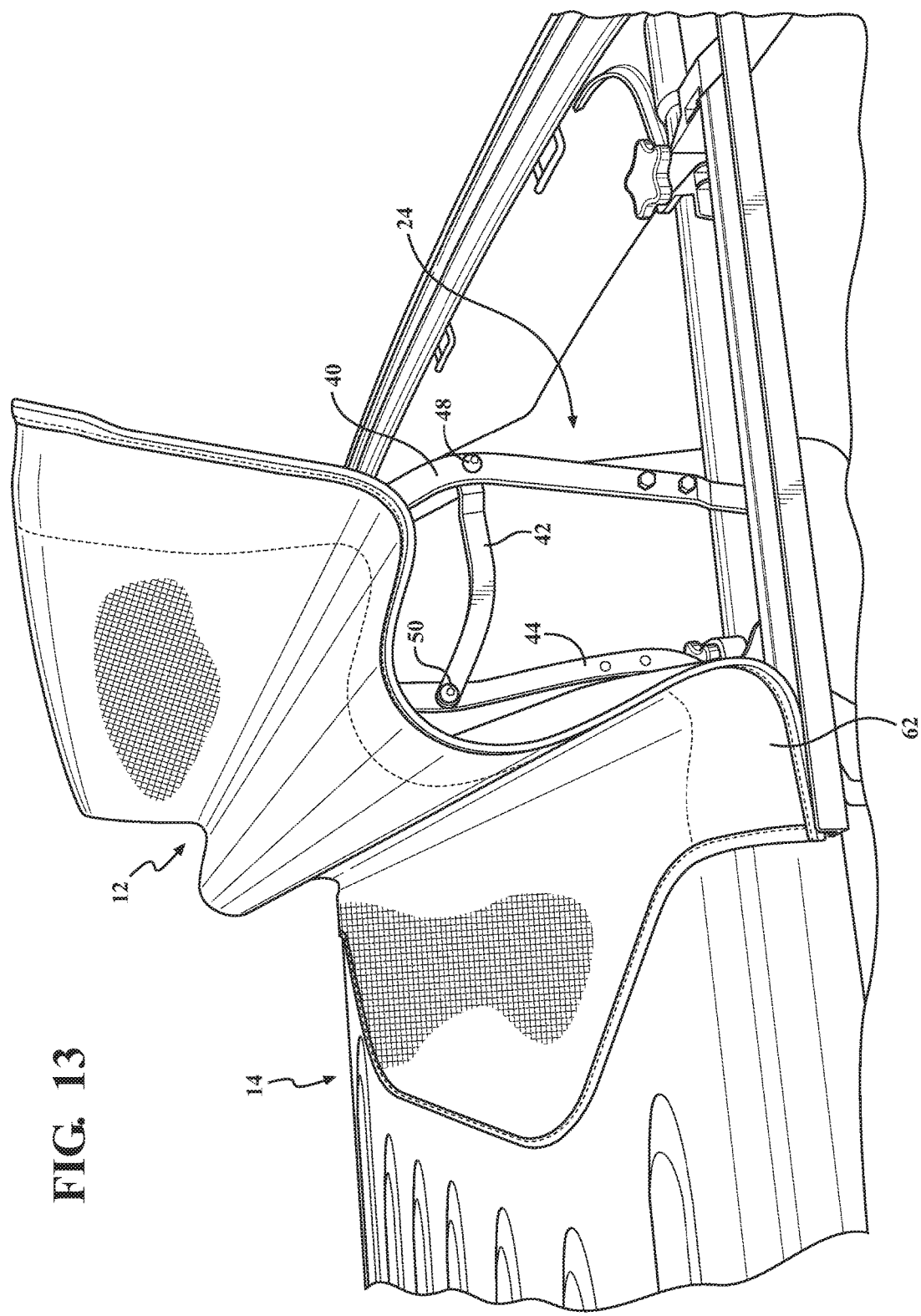
FIG. 13 is a perspective view of the soft panel top cover assembly showing the pivotable portion in a partially open position.
Figure 14:
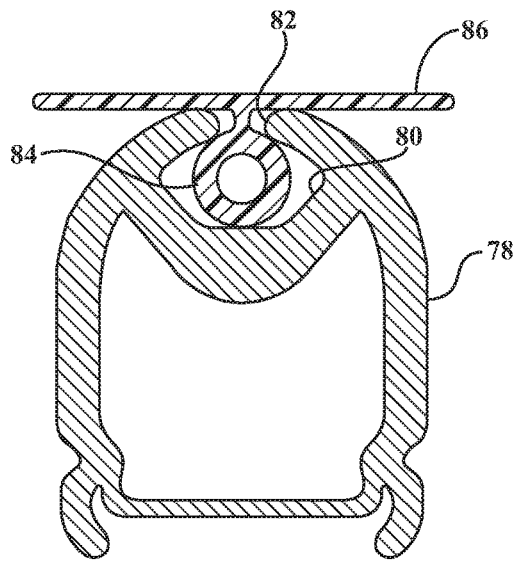
FIG. 14 is a side elevation of a fabric management bow.

The pivotable portion 24 also has a first fabric management bow 54 fixedly connected to the third links 44 by a plurality of fasteners 56. The soft panel top assembly 12 is also provided with a second fabric management bow 58 fixedly connected to a rear header member 60. The second fabric management bow 58 does not move with opening/closing of the assembly 12. Rather, the second bow 58 is operably connected with fasteners, e.g. bolted, in sockets or recesses formed in the rear header member 60. The first and second management bows 54, 58 extend in the cross car position. The combination of linkage assemblies 38 with the fabric management bows 54, 58 manages the top cover 62 as the soft panel top assembly 12 folds to the open position, which is yet another significant advantage (FIGS. 12-13). The fabric management bows 54, 58 also minimize fabric movement in the closed position, which will act to alleviate wind flap noise, in addition to managing fabric during operation and in the open position.

Preferably, the ends of the first link 40 of the side rail linkage assemblies 38 extend into the first bow member 46 and are secured thereto with a second fastener 64. At least one fastener 64 is used which in this embodiment is a nut and bolt combination, but it is within the scope of the invention that other fasteners, such as rivets, may be used as well.

The first bow 46 is adapted for releasable attachment to the windshield frame 18 for opening and closing the soft panel top assembly 12. The first bow 46 has at least attachment mechanisms 66, e.g., latches or other suitable attachment mechanism, connected thereto that have a hand actuated clamping arrangement to selectively connect to the windshield frame 18. The first bow 46 is preferably molded plastic with steel reinforcement on the bottom and comprises two attachment mechanisms 66, most preferably, latches, which when in the closed position attach to opposing features, e.g., metal loops 67, generally located under the visors of the vehicle, and when cycling to the open position, travel with the first bow 46. The attachment mechanisms 46 provide for securing closure of the top to the existing windshield frame 18 and are readily released by an operator for opening of the soft panel top assembly 12.

In accordance with a preferred embodiment, the third link 44 has at least one first curved portion generally indicated at 68 (FIG. 10), and, the first link 40 has at least one second curved portion generally indicated at 70. Generally, the bracket 34 has at least one raised portion generally indicated at 72 to position the rearward pivot point 37 at a predetermined height. The linkage assemblies 38 also include the limiting stop 10 feature operable to keep the soft panel top assembly 12 a predetermined distance away from the hard top 14. The combination of the linkage assembly 38 geometry, link geometries, and limiting stops 10 coordinate to provide the height needed for the pivotal portion 24 to lay above and near the hard top portion 14 without touching the top 14 when in the open position. Thus, there is a predetermined clearance generally shown at "A" between the linkage assembly 38 and the hard top portion 14 and a predetermined clearance indicated generally at "B" between the third link 44 and hard top portion 14 to prevent scratches or damage.

The limiting stop 10 is generally triangular, e.g., generally a right-angle triangle shape and/or scalene triangle, and is connected to the first link 40 for movement with the first link 40 between a stowed stop condition (FIG. 10) and deployed stop condition (FIG. 11) where a vertex of the limiting top 10 contacts the fixed bracket 34 to hold the first link 40 at an angle for keeping the pivotal portion 24 off the surface of the hard top portion 14.

The first fabric management bow 54 is connected to an inwardly projecting attachment portion 74 of the first link 40 by the plurality of fasteners 56. The fasteners used in this embodiment are a nut and bolt combination, but it is within the scope of the invention that other fasteners, such as rivets, may be used as well. The top cover 62 is connected to the first fabric management bow 54. In accordance with one embodiment, the first fabric management bow 54 is a round bow that slides into a pocket sewed into the top cover 48. In accordance with another embodiment, an extrusion is stitched or sewn onto the top cover 48.

In accordance with a preferred embodiment the first fabric management bow 54 and second fabric management bow 58 have a channel 76 (FIG. 10) along the length of the bows 54, 58 that is open on at least one end to receive an extrusion. The extrusion is connected to the top cover 62, e.g., bonded or adhered thereto with adhesive, and/or sewn, etc, and the extrusion is slid into the channel 76. The channel 76 is generally circular in cross section, or any other alternative cross sections suitable for attaching the cover 62 to the bows 54, 58.

Figure 15:
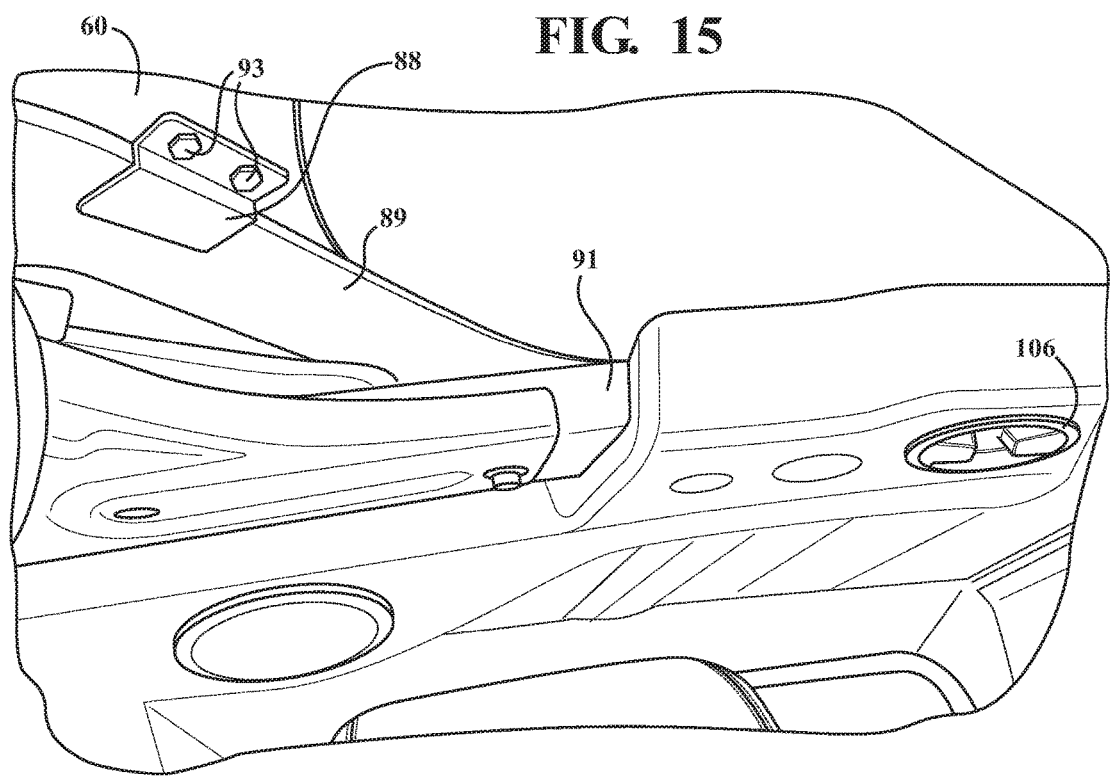
FIG. 15 is a perspective view of an attachment bracket coupled to a hardtop flange and a rear header of the soft panel top cover assembly.
Figure 16:
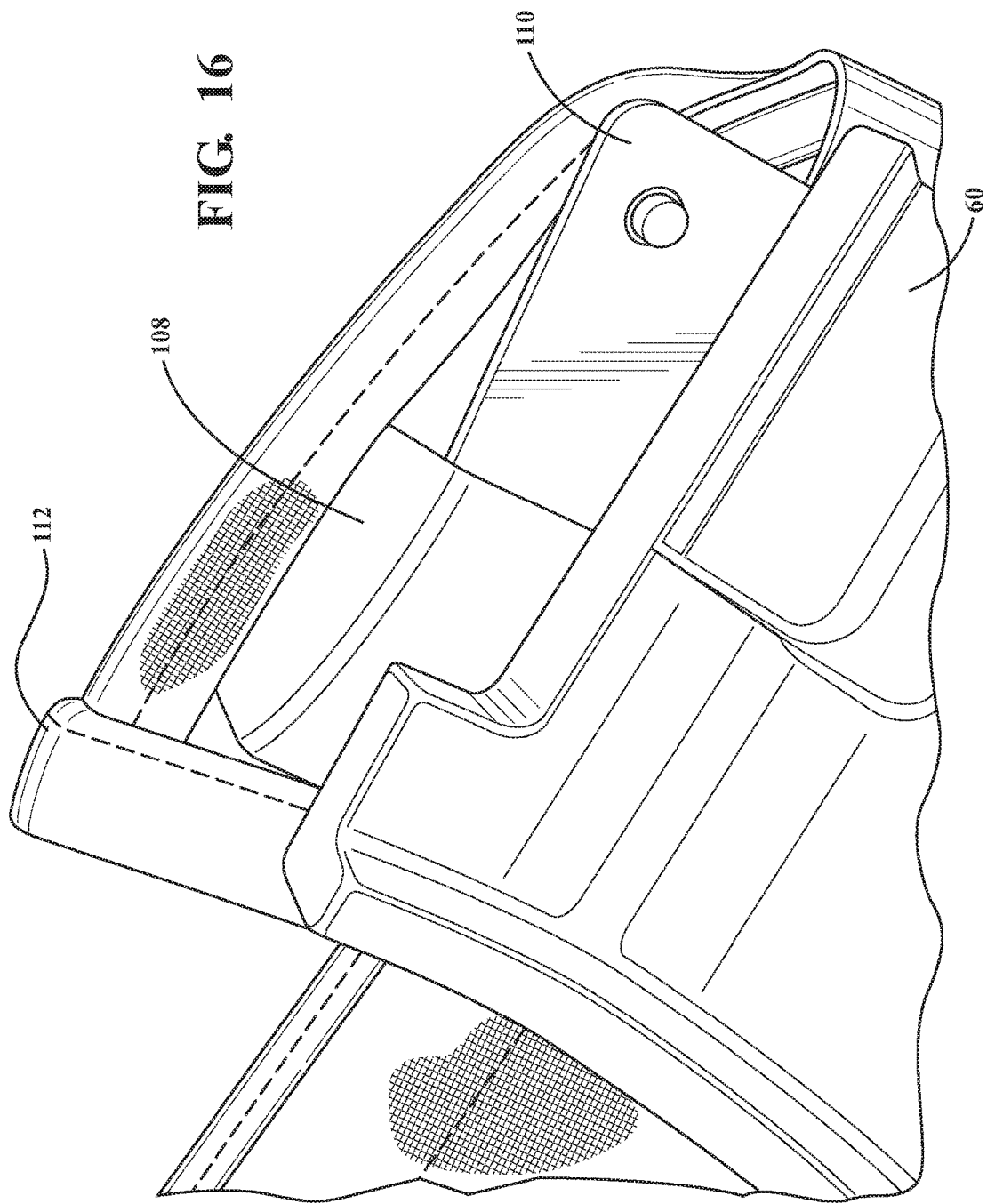
FIG. 16 is a perspective view of the cover coupled to the rear header, in accordance with an embodiment of the present invention.

A first fabric management bow 78 having a preferred channel 80 cross section is illustrated in FIG. 15 according to another embodiment. The extrusion includes a larger portion 84, e.g., larger diameter bulbous portion, received within an inner chamber of the channel 80 such that the extrusion 84 cannot work its way out laterally through a smaller opening 82 of the channel 80. At least one, preferably two, flanges 86 generally extend from the larger bulbous portion for attachment to the top cover 62, e.g., bonded or adhered thereto with adhesive, and/or sewn. After the cover 62 is attached the extrusion 84 is slid into the channel 80 along the length of the channel 80 and the first fabric management bow 78 is then connected to the attachment portion 74 of the first link 40 and the plurality of fasteners 56 applied. The second fabric management bow 58 is identical in this embodiment to the first fabric management bow 78.

Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application.

The rear header 60 has a plurality of attachment features for coupling to the sports bars 20, cross member 91, and hard top cover portion 14. At least two locating brackets 88 are connected to the bottom of the rear header 60 by at least two fasteners 93 (FIG. 15). The locating brackets 88 interface with the hardtop 14. In particular, the locating brackets 88 have a portion that fits under a portion of the existing hardtop structure at the leading edge flange 89 toward the corners.

At least two feet 90 are integrally formed with the bottom of the rear header 60 and rest on top of the cross member 91. The feet 90 include a locating lip 92 that hangs over the front edge of the cross member 91 generally toward the center of the vehicle. These feet 92 generally set the height with the hardtop 14.

The rear header 60 also includes two attachment members 94 that are integrally formed with the header and attached to the top of opposing sport bars 20 by second mushroom knobs 96. The first and second mushroom knobs 92, 96 are most preferably the same type of knob and interchangeable.

Thus, the rear header 60 is operably attached to the sports bars in two locations on the cross member 91, in two locations (1 per side) on the fore/aft sport bars 20, and interfaces with the hardtop 14 using the two locating brackets 88. No modification to the hardtop 14, no drilling of any holes, or changing of any existing components is required. The manufactures front cockpit panels are removed and the soft panel top assembly 12 is installed. In a preferred embodiment, the soft panel top assembly 12 ships as a module except that the two locating brackets 88 are connected to the underside of the rear header 60 and extends to under the hardtop 14 leading edge flange. Alternatively, the brackets 88 are also shipped attached. The process for installation of the soft panel top assembly 12 includes removing existing top and then aligning the clamping surfaces 30 of the two door rails 28 with the sport bars 20 adjacent apertures for the mushroom knobs 32, aligning the attachment members 94 of the rear header 60 on top of the sports bars 20 adjacent apertures for the second mushroom knobs 96, and/or resting the two feet 90 of the rear header 60 on top of the cross member 91. The threaded mushroom knobs 32, 96 are turned to attach the soft panel top assembly 12 to the sport bars 20. The two locating brackets 88 are positioned along the leading edge flange 89 and bolted to the underside of the rear header 60 using pre-drilled holes in the rear header 88. At least two threaded fasteners 106 extend from the bottom of the cross member 91 and/or speaker bar into pre-drilled holes on the underside of the rear header. The knobs clamp against the respective surfaces and have a pin portion extending into the respective components. As the respective knobs are tightened and screwed into the cross member 91 and sports bars 20 of the vehicle 16, the knobs connect the assembly 12 to the vehicle and also press the rear header 60 against the hard top cover seal 26.

The rear header 60 is a rear header closeout operable to engage at least one seal existing on the hard top portion 14 to provide a weatherproof seal under compression, e.g., bulb seal, gasket or other suitable seal to prevent leaks between the hard top portion 14 and assembly 12. It is within the scope of the invention to manufacture the rear header 60 as a wireframe (e.g., bent wire frame welded together), lightweight molded plastic, or other suitable lightweight material and configurations and/or combinations thereof suitable to withstand predetermined strength requirements and to sealingly engage with the hard top portion 14, depending on the particular application without departing from the scope of the invention. Most preferably, the rear header 60 has three lightweight molded pieces operably connected together.

In a preferred embodiment, a plastic retainer 108 slides over a metal backing 110 piece connected by a fastener to keep the cover 62 connected on the rear header 60, e.g., the cover is sandwiched. Similarly, the front header 46 has a similar metal backing and plastic retainer connecting the cover 62 to the header 46, e.g., the cover is sandwiched. The cover is also stitched or sewn 112 along edges. The cover 62 or soft skin or top cover of the soft panel top assembly 12 is fabric. The cover 62 is secured to the rear header 62 front header 46 without the need for snaps.

Most preferably, the seal 26 of the hard top portion 14 is a bulb seal. The seal 60 generally follows the contour toward the front of the hard top portion 14, e.g., a forward projecting stepped portion of the hard top with the seal operably attached along a top surface thereof. The rear header 52 geometry generally follows the hard top portion 14 contours and seals against the hardtop's bulb seal 26.

The soft panel top cover assembly 12 also has a cable assembly 98 located on both side that are fore/aft cables to provide tension along the sides of the fabric (FIG. 9). The cable 98 is operably connected to the header 46 and also to the rear header 60.

The soft panel top cover assembly 12 also has seals, most preferably, foam seals. At least two front corner seals 100 (FIG. 5) are operably connected, e.g., with adhesive, toward the forward end of the door rails 28 near a windshield seal. The soft panel top cover assembly 12 also has seals, most preferably, foam seals. At least two front header seals 104 are operably connected, e.g., with adhesive, near both ends of the header 46. At least two rear corner seals 102 are operably connected, e.g., with adhesive, toward the rearward end of the door rails 28 near the rear header 60 (FIG. 6). Optionally, a lip seal is operably connected to the cover 62 along at least the rear edge surface of the rear header 60. By way of example, the lip seal is sewn and/or bonded to the cover 62 and sandwiched between the cover 62 and rear header 60 at the rear of the assembly 12 near the current hardtop seal 26.

The left half of the soft panel top cover assembly 12 and corresponding features are substantially mirror image/symmetrical to the right half of the soft panel top cover assembly 12 and corresponding features depicted in the figures.

It is understood that the present invention is additionally suitable for a two door or four door vehicle.

By utilizing the pivot points attached to the door rails this allows the operator to quickly cycle the top from the closed position to the open sunroof position without removing the top. The operator would then be able to cycle the top from the open position to the closed position and latch the top just as easily. The operator does not need to leave the vehicle in order to operate the top. The whole top is made lightweight by using the rear header (wireframe and/or molded rear header) and by using minimal frame and mostly soft goods. This helps with ease of installation and ease of cycle efforts. The soft panel top assembly enables the occupant to fold the top back to gain an open air experience without removing the top and can mount to the hardtop without modification to the vehicle. The soft panel top assembly has significant benefits over typical removable hard top cockpit panels and does not require modification to the vehicle or hard top roof portion in any way.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A soft panel top assembly comprising:
   two door rails for attachment at a roof opening of a vehicle;
   a pivotable portion pivotally connected to the at least two door rails at two pivot points on each door rail;
   a header connected to the pivotable portion and adapted to selectively connect to the vehicle;
   a rear header operable for being coupled at the roof opening in the vehicle, said rear header in sealing engagement with a hardtop roof portion to provide a weather tight seal in said roof opening; and
   a cover that is a soft skin roof top cover, said cover operably connected to the header and rear header, where pivoting the pivotable portion allows the cover to move between a closed position and an open position.

2. The soft panel top assembly of claim 1, wherein the pivotable portion further comprises two side rail linkage assemblies to provide the pivotable connection with the two door rails and allow the cover to move between a closed position and an open position.

3. The soft panel top assembly of claim 2, further comprising a bracket, wherein a respective one of the brackets are each connected to a respective one of the two door rails to provide pivot points on each of the two door rails.

4. The soft panel top assembly of claim 1, wherein the pivotable portion further comprises:
   a bracket fixedly connected to each door rail;
   a side rail linkage assembly pivotably connected to each bracket to move the soft panel top assembly between the open and closed positions; and a first fabric management bow operably connected to each side rail linkage assembly to manage fabric of the cover during movement of the cover between the open and closed positions and to minimize fabric movement when the soft panel top assembly is in the closed position.

5. The soft panel top assembly of claim 1, further comprising a second fabric management bow operably fixedly connected to the rear header to at least minimize fabric movement when the soft panel top assembly is in the closed position.

6. The soft panel top assembly of claim 2, wherein the side rail linkage assemblies each further comprise:
a first link connected to the header, said first link also pivotably connected to one of two pivot points on the door rail, said first link pivotable about the pivot point;
a third link pivotably connected to the other of the two pivot points on the door rail, said third link pivotable about the pivot point;
a second link pivotably connected to the first link first link at a third pivot point, said second link also pivotably connected to the third link at a fourth pivot point, and
wherein the first link, second link, and third link arrangement coordinates pivotable movement of the pivotable portion between the open and closed positions.

7. The soft panel top assembly of claim 6, wherein the side rail linkage assemblies are operably configured with a limiting stop to not contact the hardtop roof portion when in the open position to prevent damage.

8. The soft panel top assembly of claim 6, wherein the side rail linkage assemblies each further comprise a limiting stop fastened to one of the links to keep the soft top roof assembly, other than the cover, a predetermined distance above the hardtop roof portion.

9. The soft panel top assembly of claim 1, further comprising:
at least one front corner seal affixed to each door rail portion; and/or
at least one rear corner seal affixed to each door rail portion; and/or
at least one front header seal affixed to each end of the header to provide weather resistant seals.

10. The soft panel top assembly of claim 1, wherein the two door rails each have a plurality of clamping surfaces, extending toward the vehicle interior for connecting each of said two door rails at the roof opening to a respective one of side members of the vehicle using a respective fastener, wherein the side members are fore/aft sport bars.

11. The soft panel top assembly of claim 10, the plurality of clamping surfaces further comprises:
a pair of opposing clamping surfaces to attach a front portion of each door rail to the respective sport bar; and
a rear clamping surface to attach a rear portion of each door rail to the respective sport bar.

12. The soft panel top assembly of claim 11, wherein the rear header further comprises two attachment members, each attachment member located on top of the sport bar as the rear clamping surface is below the sport bar, wherein one mushroom knob fastener connects each attachment member and rear clamping surface to the respective sport bar.

13. The soft panel top assembly of claim 1, wherein the rear header further comprises at least two feet located on top of a cross member located at the roof opening of the vehicle and setting a predetermined height for the rear header.

14. The soft panel top assembly of claim 1, further comprising at least two locating brackets connected to the bottom of the rear header and partly fitting under a leading edge flange of the hardtop portion to assist in locating and securing the rear header position.

15. The soft panel top assembly of claim 1, further comprising at least two threaded fasteners that as tightened further press the rear header down against a hardtop roof portion seal.

16. The soft panel top assembly of claim 1, wherein the pivotable portion pivots with a portion of the cover between the closed position and the open position to provide an open air feel of the soft panel top assembly without completely removing the soft panel top assembly from the vehicle.

17. The soft panel top assembly of claim 1, wherein the cover is operably connected to the rear header by a retainer and metal backing within the rear header.

18. The soft panel top assembly of claim 1, further comprising a first fabric management bow and a second fabric management bow having a channel to retain a molded extrusion connected to the cover, said first and second fabric management bows manage fabric of the cover during movement of the cover between the open and closed positions and minimize fabric movement when the soft panel top assembly is in the closed position.

19. A soft panel top assembly, comprising:
two door rails for attachment at a roof opening of a vehicle;
two side rail linkage assemblies,
wherein each respective side rail linkage assembly is connected to a respective one of the two door rails at two locations on each door rail for pivotally connecting the two side rail linkage assemblies to the two door rails;
a header connected between the two side rail linkage assemblies and adapted to being selectively coupled to the vehicle;
a rear header that is a lightweight header and operable for being coupled to side members and a cross member of said vehicle, said rear header in sealing engagement with a hardtop roof portion to provide a weather tight seal;
a cover that is a soft skin roof top cover, said cover operably connected to the header, rear header and two side rail linkage assemblies, where pivoting the two side rail linkage assemblies allows the cover to move between a closed position and an open position; and
a first fabric management bow operably connected between the side rail linkage assemblies to manage fabric of the cover during movement of the cover between the open and closed positions and to minimize fabric movement when the soft panel top assembly is in the closed position.

20. A soft panel top assembly comprising:
two door rails for attachment at a roof opening of a vehicle;
a pivotal portion pivotally connected to the at least two door rails, where pivoting the pivotal portion about pivot points on the two door rails moves the pivotal portion between a closed position and an open position;
a header connected to the pivotal portion and to a cover;
a rear header operably coupled to the cover, said rear header in sealing engagement with a hardtop roof portion to provide a weather tight seal, wherein the rear header is a lightweight molded material and has rear geometry which follows the contour of the hardtop roof portion and to seal against the hardtop roof portion; and
a first fabric management bow and a second fabric management bow each having a channel to retain a molded extrusion connected to the cover, said first and second fabric management bows manage fabric of the cover during movement of the cover between the open and closed positions and minimize fabric movement when the soft panel top assembly is in the closed position.

21. The soft panel top assembly of claim 1, wherein said soft panel top assembly fits to a front cockpit roof top opening of said vehicle and pivoting said pivotable portion moves said cover out of the way.

* * * * *